(12) United States Patent
Inaguchi

(10) Patent No.: US 9,370,850 B2
(45) Date of Patent: Jun. 21, 2016

(54) MACHINING TOOL WITH CUTTING FLUID PASSAGEWAY HAVING OPENED UPPER PORTION

(71) Applicant: FANUC Corporation, Yamanashi (JP)

(72) Inventor: Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 124 days.

(21) Appl. No.: 14/178,431

(22) Filed: Feb. 12, 2014

(65) Prior Publication Data

US 2014/0234044 A1 Aug. 21, 2014

(30) Foreign Application Priority Data

Feb. 21, 2013 (JP) ................................. 2013-032289

(51) Int. Cl.
*B23Q 11/10* (2006.01)
*B23Q 11/00* (2006.01)

(52) U.S. Cl.
CPC .............. *B23Q 11/10* (2013.01); *B23Q 11/005* (2013.01); *Y02P 70/171* (2015.11); *Y10T 409/30392* (2015.01); *Y10T 409/304032* (2015.01); *Y10T 409/304088* (2015.01)

(58) Field of Classification Search
CPC ............. Y10T 409/30392; Y10T 409/303976; Y10T 409/304088; B23Q 11/005; B23Q 11/10; B23Q 11/0057; B23Q 11/0053
USPC ............ 409/134, 131, 135, 136, 137; 407/11; 408/56, 61, 67, 89
See application file for complete search history.

(56) References Cited

U.S. PATENT DOCUMENTS

| | | | |
|---|---|---|---|
| 5,300,220 A * | 4/1994 | McEwen | 210/154 |
| 5,779,402 A | 7/1998 | Kameda | |
| 6,357,576 B1 * | 3/2002 | Enomoto | 198/495 |
| 6,382,887 B1 * | 5/2002 | Nakai | 409/136 |
| 7,686,548 B2 * | 3/2010 | Tezuka et al. | 409/137 |
| 2004/0047700 A1 * | 3/2004 | Maeda | 409/134 |
| 2006/0266012 A1 * | 11/2006 | Elliott | 55/396 |
| 2008/0118320 A1 * | 5/2008 | Shozusawa | B23Q 11/0042 409/137 |
| 2008/0251435 A1 * | 10/2008 | Tashiro et al. | 210/138 |

(Continued)

FOREIGN PATENT DOCUMENTS

FR 2751254 A1 * 1/1998
JP 4616866 Y1 6/1971

(Continued)

OTHER PUBLICATIONS

Office Action mailed May 27, 2014, corresponding to Japanese patent application No. 2013-032289.
Office Action issued Jun. 16, 2015, corresponding to Chinese patent application No. 201410059927.2.

*Primary Examiner* — Sunil K Singh
*Assistant Examiner* — Nicole N Ramos
(74) *Attorney, Agent, or Firm* — Hauptman Ham, LLP

(57) ABSTRACT

A cutting fluid passageway that supplies a cutting fluid is disposed in a machining space (inside of a machine tool) of a machining tool isolated by a cover. The cutting fluid passageway is formed so that the upper portion thereof is opened in the passageway direction. Then, the cutting fluid is supplied from the cutting fluid passageway to a workpiece and a tool during machining or to the inside of the machine tool on which scattered chips produced by the processing are accumulated.

4 Claims, 2 Drawing Sheets

(56) References Cited

U.S. PATENT DOCUMENTS

| | | | |
|---|---|---|---|
| 2008/0267723 A1* | 10/2008 | Tezuka et al. | 407/115 |
| 2009/0184040 A1* | 7/2009 | Tashiro | 210/223 |
| 2009/0250082 A1* | 10/2009 | Miller | 134/10 |
| 2010/0221082 A1* | 9/2010 | Meidar et al. | 409/137 |
| 2011/0226107 A1* | 9/2011 | Mizuta et al. | 83/177 |

FOREIGN PATENT DOCUMENTS

| | | |
|---|---|---|
| JP | 614644 A | 1/1986 |
| JP | 5-329741 A | 12/1993 |
| JP | 9-262710 A | 10/1997 |
| JP | 2005-131762 A | 5/2005 |
| JP | 2006-334716 A | 12/2006 |

* cited by examiner

MACHINING TOOL WITH CUTTING FLUID PASSAGEWAY HAVING OPENED UPPER PORTION

RELATED APPLICATIONS

The present application claims priority to Japanese Application Number 2013-032289, filed Feb. 21, 2013, the disclosure of which is hereby incorporated by reference herein in its entirety.

BACKGROUND OF THE INVENTION

1. Field of the Invention

The present invention relates to a machining tool that includes an improved passageway supplying a cutting fluid into a cover covering the machine tool.

2. Description of the Related Art

Chips are produced during processing by a machining tool, and the chips are accumulated inside a sheet-metal cover covering a machining area or surfaces of the other cover components. Accordingly, there is a need to remove the chips in order to normally and continuously use the machining tool. Here, for example, Japanese Patent Application Laid-Open 5-329741(JP 5-329741 A) or Japanese Patent Application Laid-Open 2005-131762 (JP 2005-131762 A) discloses a technique that rinses chips by using a cutting fluid and collects the chips to a cutting fluid supply device.

However, in the technique disclosed in JP 5-329741 A, square pipes are provided inside a machine so as to supply the cutting fluid therethrough, and hence a problem arises in that chips are accumulated in an upper surface portion of the square pipe. Further, the technique disclosed in JP 2005-131762 A solves the problem of JP 5-329741 A, but a fluid supply passageway is provided at the outside of a cover covering the machine. As a result, there are problems in which the manufacturing cost increases due to the complex structure and the appearance of the machine is degraded.

SUMMARY OF THE INVENTION

Therefore, the present invention is made in view of the problem of the related described above, and an object thereof is to provide a machining tool with a cutting fluid passageway that has a simple structure, prevents an increase in cost, and does not degrade the appearance of a machine tool.

A machining tool according to the present invention includes a cover that isolates the inside of a machine tool being a machining space from the outside, and machines a workpiece by moving a tool attached to a spindle relative to the workpiece set on a table. A cutting fluid supply passageway is disposed inside the machine tool, and the cutting fluid supply passageway is formed so that the upper portion thereof is opened in the passageway direction. Then, a cutting fluid is supplied from the cutting fluid supply passageway to the workpiece and the tool during the machining or a predetermined position inside the machine tool on which scattered chips are accumulated by the machining.

According to the present invention, it is possible to provide a machining tool with a cutting fluid passageway that has a simple structure, prevents an increase in cost, and does not degrade the appearance of a machine tool.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
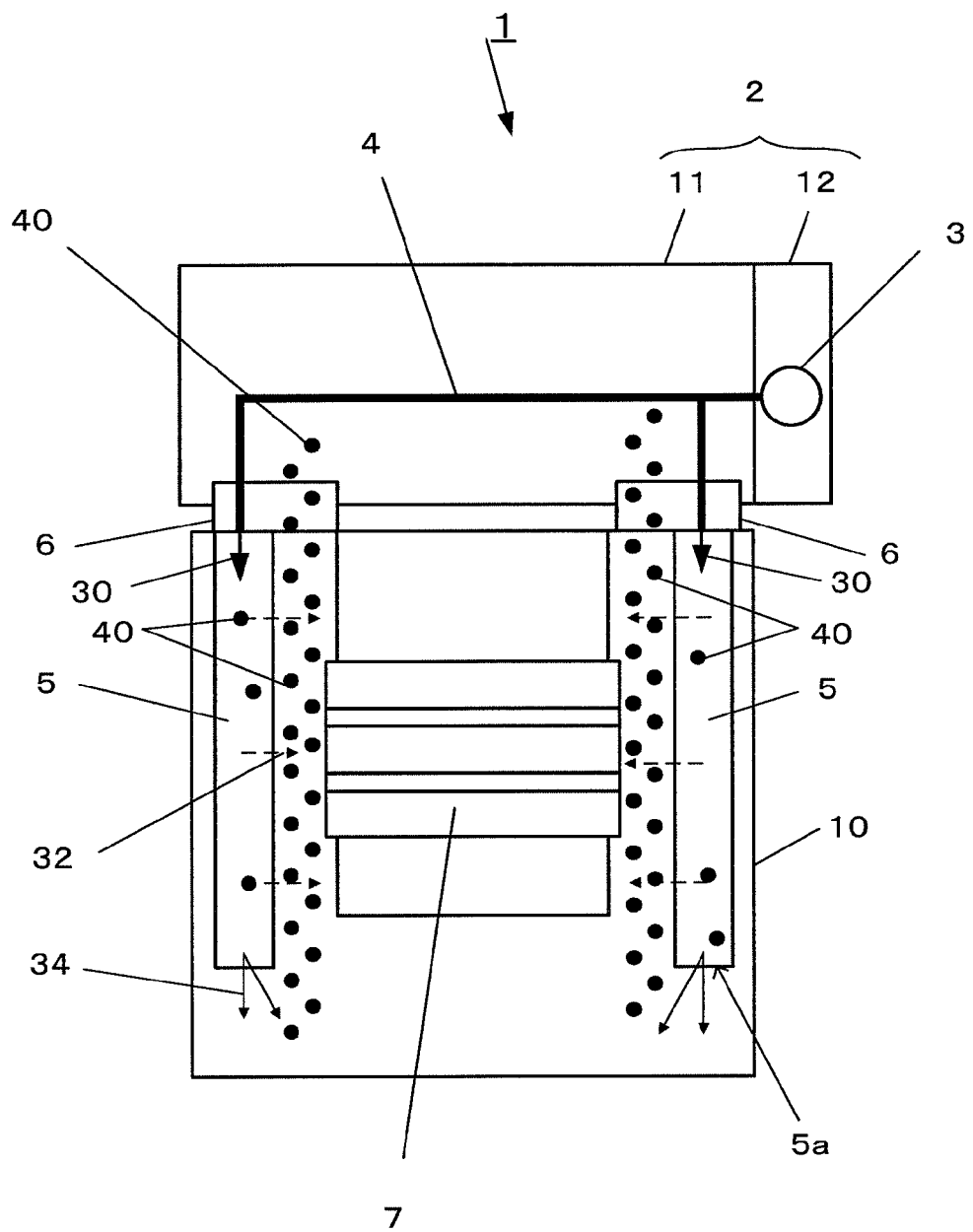
FIG. 1 is a schematic top view illustrating an embodiment of a machining tool according to the present invention.

A machining tool 1 includes a cover 10 that covers and isolates a machining space of a machining tool from the outside. In the machining space that is covered by the cover 10, a table 7 is disposed on a saddle and a bed (not shown). A workpiece 20 to be machined is placed on the table 7, and the workpiece 20 is machined by a tool 9 attached to a spindle 8. When the workpiece 20 is machined, the tool 9 and the table 7 are relatively moved.

The machining tool 1 includes a cutting fluid supply device 2 that supplies a cutting fluid into the machining space inside the cover 10. The cutting fluid supply device 2 is used to supply a cutting fluid into a predetermined position inside the machine tool on which scattered chips are accumulated due to the machining by cutting fluid supply passageways 4 and 5 so that the chips produced when the workpiece 20 is machined inside the machining space of the machining tool 1 is discharged to the outside from the machining space (the inside of the machine tool) covered by the cover 10. Further, the cutting fluid supply device 2 supplies a cutting fluid to the tool 9 or the workpiece 20 by a cutting fluid supply passageway (not shown). The cutting fluid supply device 2 includes a clean water tank 12, a sewage tank 11, a cutting fluid supply pump 3, and the cutting fluid supply passageways 4 and 5 that lead the cutting fluid into the machine tool. The cutting fluid supply passageway 5 is disposed inside the machine tool, and the upper portion thereof is opened.

The cutting fluid supply passageway 4 is formed by a conventional pipe. As shown in FIGS. 3A to 3F, the cutting fluid supply passageway 5 has a cross-section shape in which the upper portion of the passageway is opened. The cutting fluid supply passageway 5 has a shape which allows the cutting fluid supplied from the cutting fluid supply pump 3 to the cutting fluid supply passageway 5 through the cutting fluid supply passageway 4 to flow to a predetermined position of the machining space (the inside of the machine tool) inside the cover 10 through the cutting fluid supply passageway 5. Reference numeral 30 indicates the cutting fluid that flows out of the cutting fluid supply passageway 4 and flows into the cutting fluid supply passageway 5, Reference numeral 32 indicates the cutting fluid that overflows from the side portion (the upper opened portion of the cutting fluid supply passageway 5) of the cutting fluid supply passageway 5, and Reference numeral 34 indicates the cutting fluid that flows out of the end of the cutting fluid supply passageway.

Chips 40 that are removed from the machining space (the inside of the machine tool) inside the cover 10 by the stream of the cutting fluid is collected to the sewage tank 11 of the cutting fluid supply device 2 while passing through a cutting fluid discharge passageway 6 along with the cutting fluid. The cutting fluid that includes chips, collected to the sewage tank 11, flows into the clean water tank 12 after the chips are removed therefrom by a purification unit (not shown).

Figure 2:
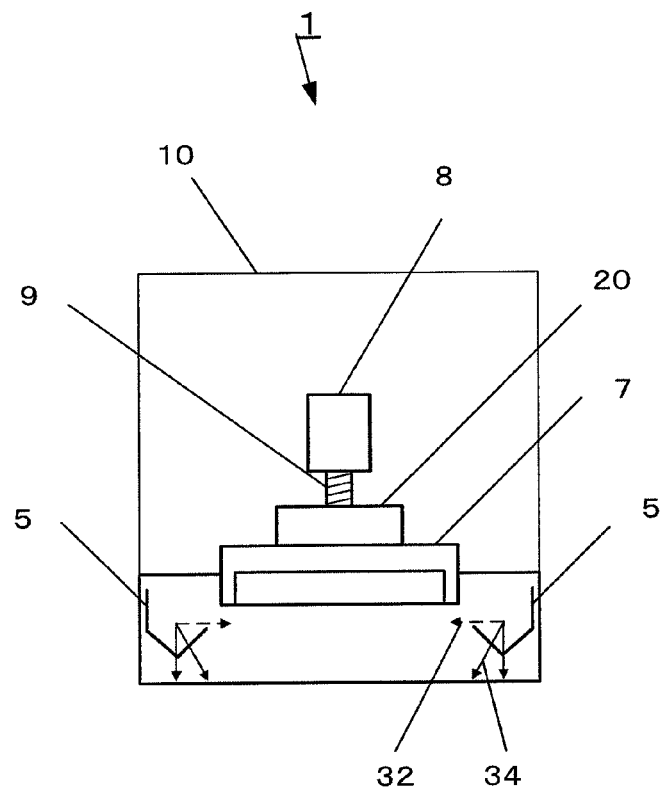
FIG. 2 is a schematic front view illustrating the machining tool of FIG. 1.
Figure 3A:
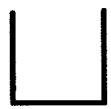
FIGS. 3A to 3F are views illustrating several examples of a cross-sectional shape of a cutting fluid passageway that is provided in a machining space of the machining tool of FIG. 1.
Figure 3B:
Figure 3C:
Figure 3D:
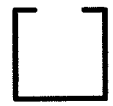
Figure 3E:
Figure 3F:

The cutting fluid supply passageway 5 of which the upper portion is opened will be described. The cutting fluid that is supplied from the cutting fluid supply passageway 4 is led to a predetermined position of the machining space (the inside of the machine tool) isolated by the cover 10 through the cutting fluid supply passageway 5. As shown in FIGS. 1 and 2, the cutting fluid supply passageway 5 is formed so that the upper portion thereof is opened in the passageway direction when the cutting fluid supply passageway is horizontally disposed in the machining space (the inside of the machine tool) (that is, the cross-section of the cutting fluid supply passageway 5 is formed in a shape that is not surrounded by a closed curve, as shown in FIGS. 3A to 3F).

Furthermore, the upper portion of the cutting fluid supply passageway 5 does not need to be opened over the entire length, and the portion onto which the chips do not come down may not be opened. Further, an end 5a of the cutting fluid supply passageway may be formed in a wall shape so as to close the end or may be opened without forming a wall.

Even when the chips 40 that are produced by the machining of the workpiece come down onto the cutting fluid supply passageway 5, the chips 40 overflow from the upper opened portion of the cutting fluid supply passageway 5 along with the cutting fluid supplied from the cutting fluid supply device 2 so as to be supplied to a predetermined position since the upper portion of the cutting fluid supply passageway 5 is opened. Accordingly, it is possible to eliminate the problem of the related art in which chips are accumulated in the unit that supplies the cutting fluid into the machine tool.

Then, the cutting fluid is collected to the cutting fluid supply device 2 (the sewage tank 11) through the cutting fluid discharge passageway 6 along with the chips 40 that are removed from the inside of the cover (that is, the inside of the machine tool) or the other components by the stream. Further, when the cutting fluid is supplied to the cutting fluid supply passageway 5 of which the upper portion is opened, the pressure loss decreases as compared to the case where the cutting fluid is supplied to the closed passageway, and hence a large amount of the cutting fluid may be supplied to the cutting fluid supply passageway 5. Accordingly, even when the cutting fluid overflows from the cutting fluid supply passageway 5, the cutting fluid comes down into the cover 10, and hence no severe problem arises. In addition, since the cutting fluid discharge passageway 5 of which the upper portion is opened may be formed in a simple shape, an increase in cost may be suppressed. Further, since the cutting fluid supply passageway 5 is provided inside the cover 10, it is possible to prevent a problem in which the appearance of the machining tool becomes poor when the cutting fluid supply passageway is provided outside the cover.

The cutting fluid supply passageway 5 may be provided on one side or both sides of the inner space of the cover 10. Further, the cross-sectional shape in which the upper portion of the cutting fluid supply passageway 5 is opened is not limited to the shapes exemplified in FIGS. 3A to 3F, and various other shapes may be employed.

The invention claimed is:

1. A machining tool, comprising:
    a cover that isolates the inside of the machining tool, which is a machining space, from the outside, wherein the machining tool is configured to machine a workpiece by moving a tool attached to a spindle relative to the workpiece set on a table; and
    a cutting fluid passageway disposed inside the machine tool and configured to supply a cutting fluid to a predetermined position inside the machine tool on which scattered chips are accumulated by machining,
    wherein the cutting fluid passageway extends in a single straight line from a first side of the machining space to a second side of the machining space, the second side opposite to the first side,
    wherein the cutting fluid passageway has an end at the second side, and a side portion between the first side and the second side, and
    wherein the cutting fluid passageway has an opening in the upper portion thereof and along a passageway direction of the cutting fluid passageway, and is configured to supply both (i) the cutting fluid that overflows from the side portion of the cutting fluid passageway and (ii) the cutting fluid that flows out of the end of the cutting fluid passageway to said predetermined position.

2. The machining tool according to claim 1, wherein the opening is configured to supply the cutting fluid that overflows a side wall of the cutting fluid passageway to said predetermined position.

3. The machining tool according to claim 1, wherein the predetermined position is located below the cutting fluid passageway.

4. The machining tool according to claim 2, wherein the predetermined position is located below the cutting fluid passageway.

* * * * *